United States Patent [19]

Brown et al.

[11] Patent Number: 4,537,285

[45] Date of Patent: Aug. 27, 1985

[54] CONVEYOR LUBRICATING APPARATUS

[76] Inventors: Patrick A. Brown, 1490 South Stone Rd.; William C. Murphy, 9576 West 40th St., both of Fremont, Mich. 49412

[21] Appl. No.: 483,941

[22] Filed: Apr. 11, 1983

[51] Int. Cl.³ .............................................. F16N 29/00
[52] U.S. Cl. .................................... 184/15.2; 184/6.1; 184/6.4; 184/6.28; 198/500
[58] Field of Search ...................... 184/1 C, 6, 6.1, 6.4, 184/6.28, 7 R, 15.1, 15.2, 15.3, 64; 198/500; 361/170, 187; 417/317

[56] References Cited

U.S. PATENT DOCUMENTS

| 3,031,033 | 4/1962 | Burrows ................................. 184/15 |
| 3,350,018 | 10/1967 | Harris et al. ...................... 184/1 C X |
| 3,450,227 | 6/1969 | Montgomery ........................... 184/6 |
| 3,463,268 | 8/1969 | Krause .................................. 184/1 |
| 3,674,112 | 7/1972 | Roberts ................................ 184/6.1 |
| 3,785,456 | 1/1974 | McIntire et al. .................... 184/6 R |
| 3,976,989 | 8/1976 | Smith ............................... 184/1 C X |
| 4,064,970 | 12/1977 | Reeves ................................ 184/15 B |
| 4,085,821 | 4/1978 | Kast et al. ......................... 184/15 A |
| 4,212,372 | 7/1980 | Murphy et al. ..................... 184/15 B |
| 4,271,930 | 6/1981 | Thomson et al. ................. 198/500 X |
| 4,274,509 | 6/1981 | Thomson et al. .................. 184/15 B |
| 4,326,603 | 4/1982 | Darrow et al. ...................... 184/6.1 |
| 4,368,803 | 1/1983 | Dombroski et al. ............... 184/15.3 |

FOREIGN PATENT DOCUMENTS

| 0049598 | 4/1982 | European Pat. Off. ............ 198/500 |
| 2229990 | 6/1974 | Fed. Rep. of Germany ...... 184/1 C |
| 2265037 | 2/1976 | Fed. Rep. of Germany ...... 198/500 |
| 2716559 | 10/1977 | Fed. Rep. of Germany ....... 184/6.1 |

Primary Examiner—David H. Brown
Assistant Examiner—John E. Griffiths
Attorney, Agent, or Firm—Basile, Weintraub & Hanlon

[57] ABSTRACT

A conveyor lubrication apparatus includes a counter for energizing lubrication devices once for each predetermined number of cycles of the conveyor past a lubrication station. Timers energized by the counter activate control valves for a predetermined period of time to supply lubricant to parts of the conveyor as each part reaches the lubrication station. A current sense circuit detects current flow to the control valves and energizes the central lubricant supply pump to pressurize the lubricant flow lines for a predetermined period of time, at the end of which the pump is de-energized until the next control valve is energized. A pressure sensor is disposed in the lubricant flow lines to detect a low pressure level and causes the pump to be de-energized and an alarm to be activated.

3 Claims, 7 Drawing Figures

CONVEYOR LUBRICATING APPARATUS

BACKGROUND OF THE INVENTION

1. Field of the Invention

This invention relates, in general, to conveyors and, more specifically, to automatic conveyor lubrication apparatus.

2. Description of the Prior Art

A common method of moving parts or components along a manufacturing assembly line is by means of overhead conveyors. Such conveyors are formed of a number of wheeled trolleys which ride along a guideway or track in a continuous closed loop. The trolleys are interconnected by a chain formed of a number of connected links. The parts or components are suspended from the trolley.

The conveyor chain and wheeled trolleys include many interconnected parts which require periodic lubrication. These parts include the trolley roller bearings and the joined parts of the numerous chain links. Automated lubrication equipment has been devised to eliminate the need for manual lubrication and to provide a consistently precise quantity of lubricant to the various portions of the conveyor so as to prevent wear and the problems associated with overlubrication.

Such automated conveyor lubrication systems include a central pump-driven lubrication tank which provides lubricant under pressure throughout flow lines. Control valves or other fluid flow metering devices are energized at the appropriate time to dispense a predetermined quantity of lubricant to the desired element of the conveyor. Typically, switches, such as photo, limit or proximity switches, detect each chain link or trolley of the conveyor as it arrives at the lubrication station and are operative through electric control equipment to energize the valves for the application of lubricant to the conveyor parts.

Since conveyors typically move at a slow rate of speed along a predetermined path within a manufacturing plant, it is oftentimes unnecessary to lubricate the parts or elements of the conveyor on each cycle as this could result in overlubrication which is costly and could cause excess lubricant to drip from the conveyor onto the parts suspended therefrom or the underlying plant area. Thus, counter apparatus as disclosed in U.S. Pat. No. 4,064,970 have been devised to count the number of cycles of the conveyor past the lubrication station and to activate the lubrication apparatus once for each of a predetermined number of cycles of the conveyor. In this manner, all of the desired parts or elements of the conveyor are lubricated once for every predetermined number of cycles of the conveyor past the lubrication station.

However, such previously devised conveyor lubrication apparatus have not been without drawbacks. The counters utilized to provide lubrication once for every predetermined number of cycles of the conveyor past a lubrication station are not easily resetable to provide different frequencies of lubrication. Furthermore, even though the lubrication is applied only once for every predetermined number of cycles of the conveyor past the lubrication station, the central lubricant pump is continually maintained in an energized state in order to maintain pressure within the lubrication lines. This wastes power and places undue wear on the lubrication pump since the lubricant is dispensed only infrequently.

Thus, it would be desirable to provide a conveyor lubrication apparatus which overcomes the problems associated with previously devised conveyor lubrication apparatus. It would also be desirable to provide a conveyor lubrication apparatus which is easily programmable so as to provide any desired frequency of lubrication of the various elements of the conveyor. It would also be desirable to provide a conveyor lubrication apparatus in which the centrally located lubrication pump is de-energized between non lubrication cycles of the conveyor.

SUMMARY OF THE INVENTION

There is disclosed a unique conveyor lubrication apparatus for automatically lubricating preselected elements or components of a conveyor. The lubrication apparatus includes a central pump-driven lubrication reservoir or tank which supplies lubricant through lubricant flow lines to a plurality of controllable valve means which are mounted in a lubrication station adjacent to the conveyor.

A plurality of detector means, such as limit switches, are mounted in the lubrication station for respectively detecting the presence of the start point of the conveyor as well as the presence of each element, such as the movable trolleys or interconnected chain links, at the lubrication station. Counter means responsive to the presence of the first element of the conveyor at the lubrication station energizes the conveyor lubrication apparatus for the application of lubricant to each part of the conveyor once for every predetermined number of cycles of the conveyor past the lubrication station. The counter means is programmable by means of settable switches so as to provide any desired frequency of lubrication application to the conveyor.

Timer means responsive to the counter means and the detector switches energize the control valves at predetermined times to apply lubricant to each part of the conveyor as each part passes the lubrication station. A unique current sense circuit is provided for detecting the energization of any of the control valves. The current sense circuit is adapted to instantaneously energize the central pump to pressurize the lubrication flow lines for a predetermined period of time, at the end of which the pump is de-energized until a subsequent control valve is energized.

A pressure sensor is disposed in the lubrication flow lines for detecting low pressure levels. The pressure sensor is electrically connected to the central pump and causes the pump to be de-energized and an alarm to be activated in the event that a low pressure level is detected.

The unique conveyor lubrication apparatus of the present invention affords many advantages over previously devised conveyor lubrication apparatus. For one, the present conveyor lubrication apparatus is easily programmable so as to provide lubrication of the various elements or part of the conveyor at any desired frequency interval. The conveyor lubrication apparatus of the present invention also includes a unique current sense circuit which detects when any of the lubrication control valves have been energized. The current sense circuit instantaneously energizes the central pump so as to pressurize the lubrication flow lines and, more importantly, de-energizes the pump a predetermined amount of time after a control valve has been energized. In this manner, unnecessary energization of the pump is eliminated which minimizes wear on the pump. The current sense circuit also provides energy savings since the pump is de-energized during nonlubrication cycles of the conveyor. Finally, the conveyor lubrication apparatus of the present invention includes a pressure sensor which is uniquely disposed in the lubrication flow lines for detecting low pressure levels. If a low pressure level is detected, the pressure sensor through appropriate control circuitry causes the pump to be de-energized and an alarm to be activated to immediately indicate the occurrence of a low pressure condition.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Throughout the following description and drawing, an identical reference number is used to refer to the same component shown in multiple figures of the drawing.

Figures 1, 2, 3:
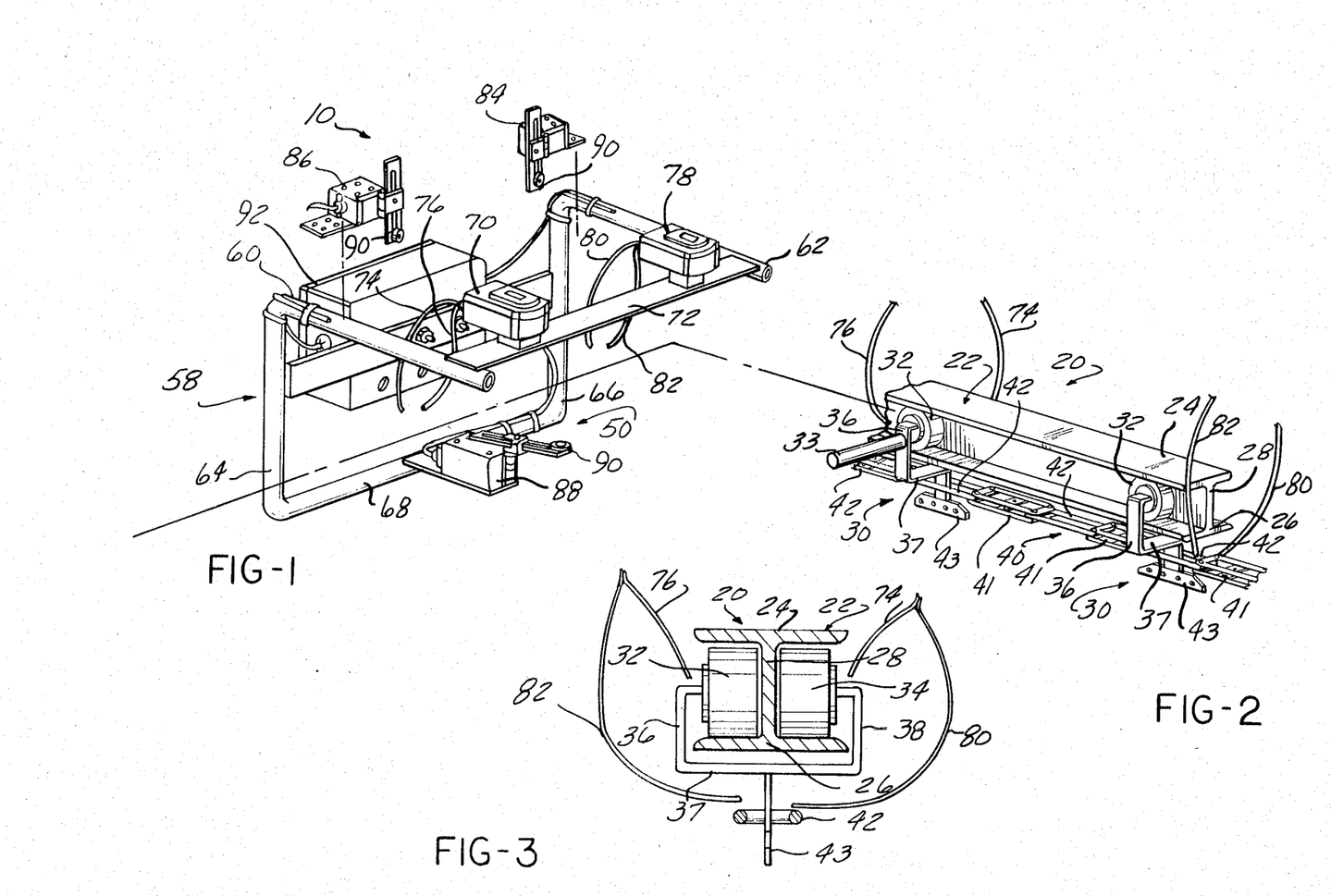
FIG. 1 is an exploded, perspective view of a conveyor lubrication apparatus constructed in accordance with the teachings of the present invention.
FIG. 2 is a perspective view of a conveyor which may be used with the conveyor lubrication apparatus of the present invention.
FIG. 3 is an end view of the conveyor illustrated in FIG. 2.

Referring now to the drawing, and FIGS. 1, 2 and 3 in particular, there is illustrated a conveyor lubrication apparatus 10 which is operative to automatically lubricate various elements or parts of a movable conveyor, a portion of which is illustrated in FIGS. 2 and 3 and denoted in general by reference number 20.

By way of example only, the conveyor 20 is in the form of a continuous closed-loop path having an elongated continuous track or guideway 22. Preferably, the track or guideway 22 is in the form of an I-beam having spaced, horizontally extending legs 24 and 26 which are interconnected by a vertical intermediate web portion 28. The lower horizontal leg 26 forms a track for a plurality of trolleys 30 which move therealong. Each of the trolleys 30 includes two rollers or wheels 32 and 34 which ride along the horizontal leg 26 of the I-beam 22 on opposite sides of the intermediate web 28.

Arms 36 and 38 are connected to and depend downward from each of the rollers 32 and 34, respectively, and are interconnected at a lower end by a cross bar 37. A hanger 43 is connected to the cross bar 37 on each trolley 30 for supporting parts or components therefrom.

A chain 40 formed of a plurality of interconnected links 41 and 42 connects each of the trolleys 30. Alternating links 42 are disposed about the hangers 43 and transmit driving force through the hangers 43 to the trolleys 30 to cause movement of the trolleys 30 as the chain 40 is driven in a conventional manner.

As is well known, the conveyor 20 includes a plurality of movable parts which are subject to wear. These parts typically include the bearings of each roller 32 as well as the interconnected portions of the conveyor links 41 and 42. Thus, it is necessary that these parts be lubricated in order to prevent undue wear. The conveyor apparatus 10 of the present invention is constructed to provide automatic lubrication of selected elements or parts of the conveyor 20, such as the trolley 32 bearings, as well as the interconnected portions of the conveyor links 41 and 42. The conveyor lubrication apparatus 10, as shown in FIG. 1 and schematically in FIG. 4, includes a lubrication station 50 which is mounted at one point along the conveyor 20. Lubricant is supplied to the station 50 from a remotely located central lubricant tank or reservoir 52. A motor driven pump 54 is mounted within the reservoir 52 for pressurizing lubricant flow lines 56 extending from the central tank 52 to the lubrication station 50.

As shown in FIG. 1, the lubrication station 50 includes a frame or support structure 58 on which the various control components of the conveyor lubrication apparatus 10 are mounted. The frame 58 includes an elongated tubular member which is formed with two spaced, horizontally extending upper leg portions 60 and 62, depending vertical sections 64 and 66 and a horizontal interconnecting base portion 68. The upper leg portions 60 and 62 are adapted to be securely mounted to the top surface of the upper leg 24 of the conveyor track 22 by means of welding or other fasteners. The depending vertical sections 64 and 66 and the interconnecting base portion 68 extend away and downward from the track 22 and provide support structure for the various components of the conveyor apparatus 10.

By way of example, the conveyor lubrication apparatus 10 is configured for lubricating the trolley roller 32 bearings as well as the interconnected portions of the conveyor links 41 and 42. It will be understood, however, that other portions of the conveyor 20 may also be lubricated if necessary.

Lubrication of the trolley 30 bearings 32 is provided by a controllable valve means, such as a solenoid-operated valve 70. The valve 70 is mounted on a strap 72 which is affixed to and extends between the upper leg portions 60 and 62 of the support frame 58. A pair of lubricant flow tubes, such as capillary tubes 74 and 76, extend from the valve 70 and have an open end disposed in proximity with the trolley 30 bearings as each trolley 30 passes the lubrication station 50.

A second controllable valve means 78 is also mounted on the strap 72 of the frame 58. A pair of capillary supply tubes 80 and 82 extend from the valve 78 and are disposed such that the open ends are located in proximity with the interconnected portions of the conveyor chain 50 as each interconnected portion passes the lubrication station 50. Each of the valves 70 and 78 is disposed in fluid communication with the central lubricant tank 52 by means of lubricant flow lines 56, as shown in FIG. 4.

The conveyor lubrication apparatus 10 is designed to provide lubricant to selected elements or parts of the conveyor 20 once for every predetermined number of cycles of the conveyor 20 past the lubrication station 50. Accordingly, it is necessary to detect when the selected elements or parts of the conveyor reach the lubrication station 50. In a preferred embodiment, first, second and third detector means 84, 86 and 88, respectively, are mounted on the support frame 58. Each of the detector means 84, 86 and 88 has a movable detector arm 90 mounted thereon which is adapted to be engaged by a selected portion of the conveyor 20 so as to switch the electric contacts of each limit switch and provide an electrical signal indicating that the selected element or part of the conveyor 20 has reached the lubrication station 50.

The controllable valves 70 and 78, as well as the first, second and third detector means or switches 84, 86 and 88, respectively, are electrically connected to a lube control unit 92 which is mounted on the support frame 58. The lube control unit 92 includes the circuitry used to selectively activate the valves 70 and 78 to apply lubrication to the desired parts of the conveyor 20.

Figure 4:
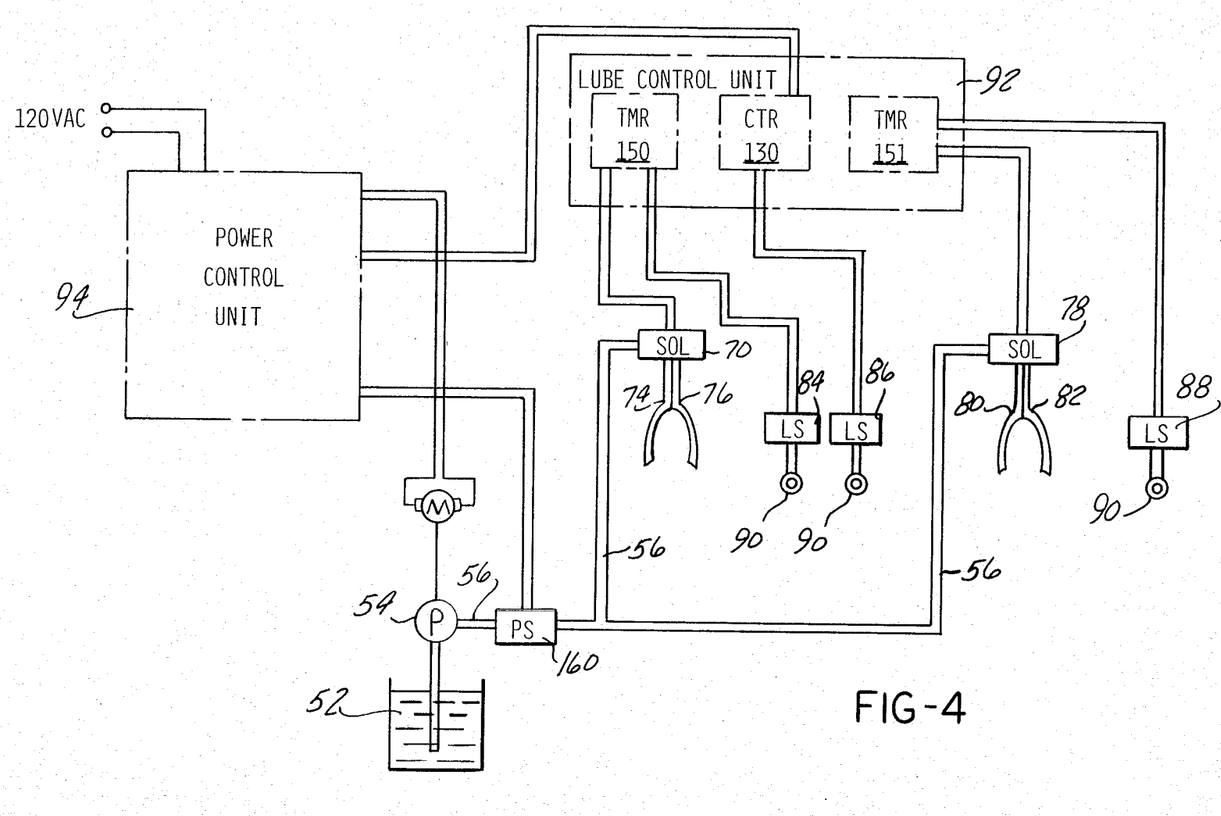
FIG. 4 is a schematic diagram of the conveyor lubrication apparatus shown in FIG. 1 depicting the lubrication flow lines and electrical wiring connections.
Figure 5:
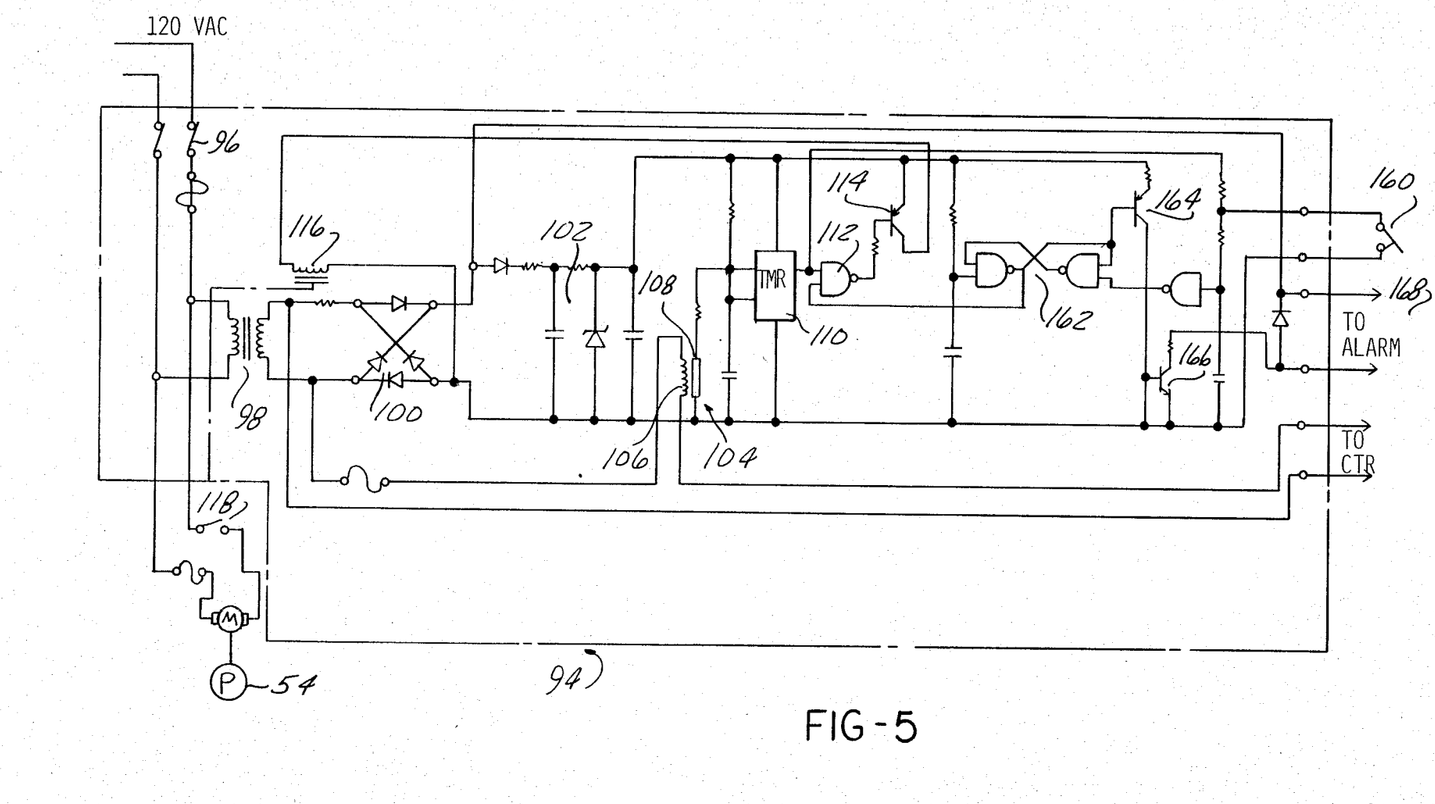
FIG. 5 is a circuit diagram of the power control unit illustrated in FIG. 4.

The conveyor lubrication apparatus 10 also includes a power control unit 94 as shown in FIG. 4, and in greater detail in FIG. 5 which may be mounted at the lubrication station 50, or, preferably, located adjacent to the central lubrication tank 52. The power control unit 94 houses the circuitry and control equipment used to energize the pump 54 and pressurize the lubricant flow lines 56. In the power control unit 94, a main disconnect switch 96 is provided for activating the conveyor lubrication apparatus 10 of the present invention. A transformer 98 is connected to the switch 96 and transforms the 120 VAC input voltage to 24 VAC. A rectifying bridge 100 and a filter 102 are connected to the secondary winding of the transformer 98.

Each of the control valves 70 and 78 is connected to the secondary winding of the transformer 98. Current sense means, denoted in general by reference number 104, is provided for sensing when either of the control valves 70 or 78 is energized. The current sense means 104 includes a hand-wound coil 106 which is preferably formed of 115 turns of number 30 wire. The coil 106 senses current flow to any of the control valves 70 and 78, as will be described in greater detail hereafter, and is operative to close the contact of a reed relay 108. The contact of the reed relay 108 is connected to the input of a timer 110 and activates the timer 110 when current flow is detected to any given control valve 70 or 78.

Upon energization, the output of the timer 110 will switch to a high voltage level. The output of the timer 110 is connected as an input to a NAND gate 112, the output of which is connected to the base electrode of a transistor 114. The output of the timer 110 will remain in the high state for a predetermined period of time which is selectable by utilizing appropriate values for the resistor and the capacitor connected to the input of the timer 110.

A second input to the NAND gate 112 is normally in a high state such that when the output of the timer 110 goes to a high state, the output of the NAND gate 112 will go low which will drive the transistor 114 into conduction and cause current flow to and energization of a relay coil 116. The output contact 118 of the relay coil 116 is connected between the source of electrical power and the pump 54 and switches states so as to supply electrical power to the pump 54 when the relay 116 is energized. In this manner, the pump 54 pressurizes the lubricant flow lines 56 and supplies lubricant to each of the control valves 70 and 78.

Figure 6:
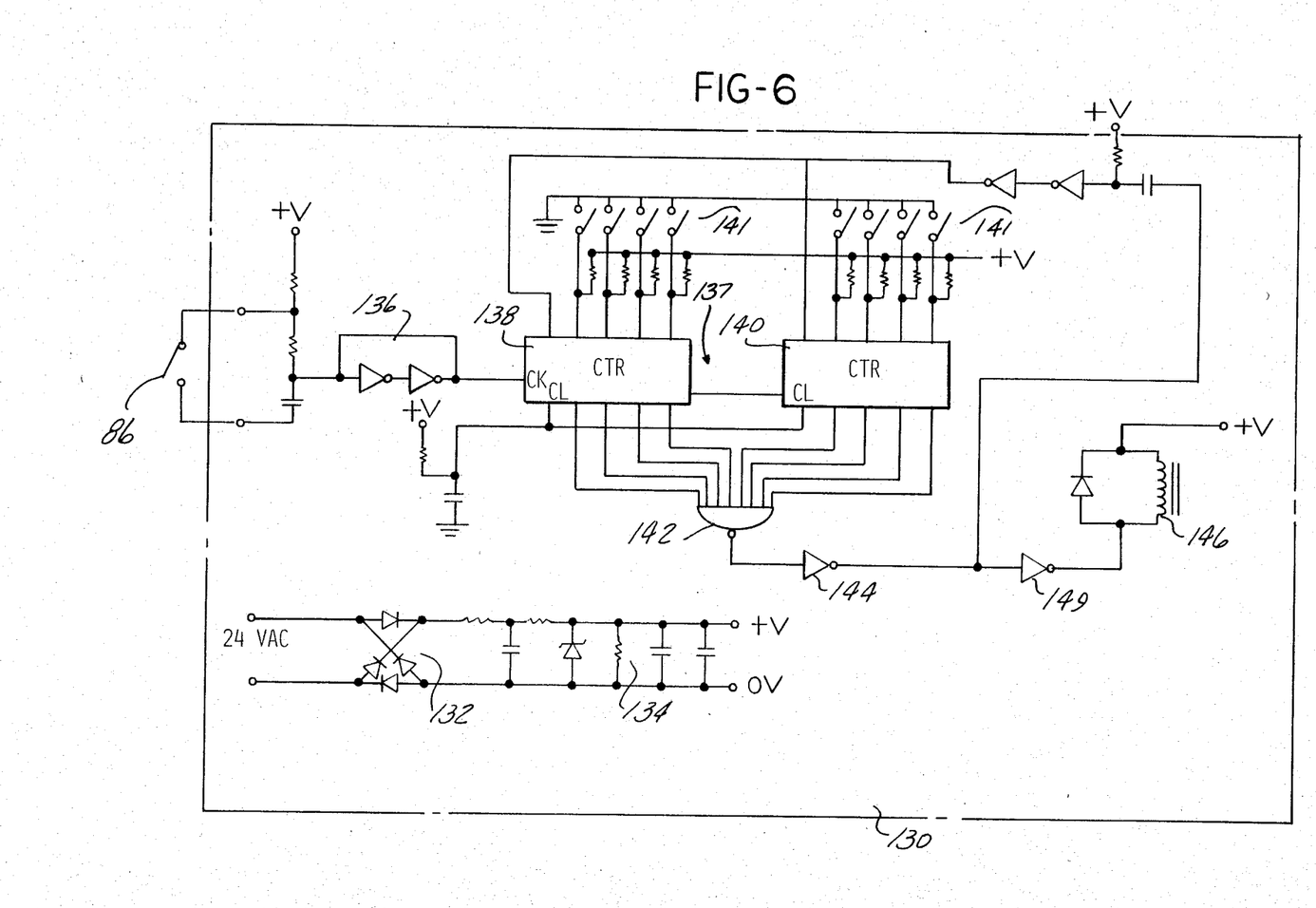
FIG. 6 is a circuit diagram of the counter circuit illustrated in FIG. 4.
Figure 7:
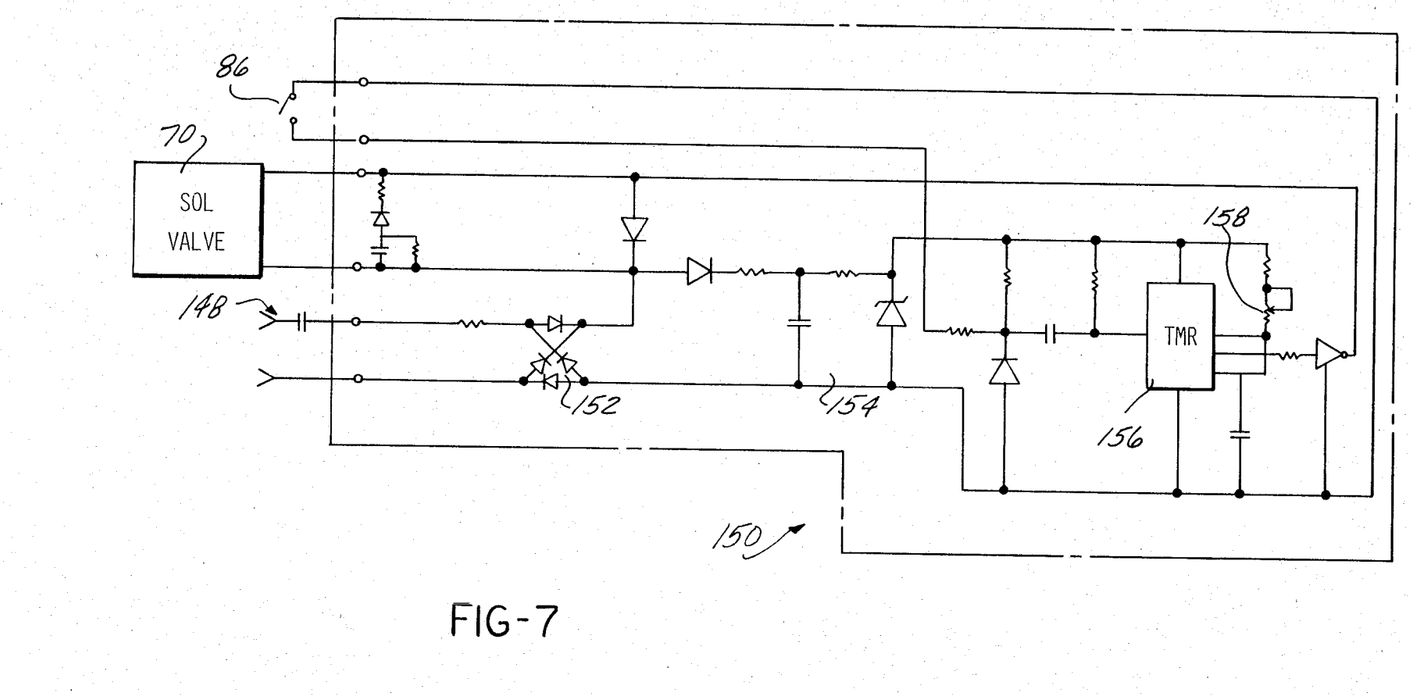
FIG. 7 is a circuit diagram of the timer circuit illustrated in FIG. 4.

Turning now to FIGS. 6 and 7, there is depicted the control means which is operative to selectively energize the control valves 70 and 78 to apply lubrication to the predetermined or parts of the conveyor 20. As shown in FIG. 6, the lube control unit 92 includes a counter means 130 which is operative to count the number of cycles of the lead element of the conveyor 20 past the lubrication station 50. The counter means 130 is responsive to and receives as an input the output of the second detector means or switch 86. As described above, the second detector means 86 is adapted to detect the presence of the lead or first element of the conveyor 20 each time it passes the lubrication station 50. The detector arm 90 on the second detector switch 86 is engaged by an arm or dog 33, see FIG. 2, attached to the lead trolley 30 of the conveyor 20 so as to be activated once for each cycle of the lead trolley 30 past the lubrication station 50.

The counter means 130 includes a bridge rectifying circuit 132 and filter network 134 which transforms the 24 VAC input power to the low level voltage required by the electronic components utilized in the counter means 130.

The output of the second detector means or switch 86 is input through inverters 136 to a binary counter 137 which is formed of two serially connected 4-bit counters 138 and 140. The counters 138 and 140 also receive as inputs a plurality of progammable switches 141. Preferably the switches 141 are input in two groups of four to the counters 138 and 140 so as to provide the capability of preprogramming any count between 0 and 255 into the serially connected counters 138 and 140.

The counters 138 and 140 are adapted to count down one count from the preprogrammed count once for each energization of the second detector means 86 which corresponds to one cycle of the lead element or trolley 30 of the conveyor 20 past the lubrication station 50. When the counters 138 and 140 count down to 0, all of the outputs of the counters 138 and 140, which are connected as inputs to a NAND gate 142, will be in a high state which drive the output of the NAND gate 142 low. This signal is passed through inverters 144 and 149 and energizes the coil of a relay 146. A contact 148, shown in FIG. 7, is responsive to the energization of the relay coil 146 and is operative to energize the timer means, as will be described in greater detail hereafter. The output of the NAND gate 142 is also reapplied to the counter elements 138 and 140, when the counters reach 0, to reload the preprogrammed count set by the switches 142 back into the counters 138 and 140.

As shown in FIG. 4, the lube control unit 92 of the present invention includes identical timer means 150 and 151 which are asscoiated with each control valve 70 and 78, respectively. As each of the timer means 150 and 151 is identical, the following description is provided only for the timer 150 assoicated with valve 70. As shown in FIG. 7, the timer means 150 is responsive to the output of the first detector means or switch 84 (timer means 151 is responsive to the third detector means 88). The timer means 150 is operative to control the energization of the valve 70 which applies lubricant to the bearings 32 of each trolley 30 when the trolley 30 reaches the lubrication station 50. 24 VAC input power is supplied to the timer means 150 through the contact 148 energized by the output of the counter 130.

A rectifying bridge 152 and filter network 154 are provided to provide the appropriate voltage levels used to drive the timer 150. When the counter 130 has been activated lubricant will be applied to each element or part of the conveyor 20 during the next cycle of the conveyor 20 past the lubrication station 50. Closure of the second detector means or switch 86, which closes when each trolley 30 reaches the lubrication station 50, will energize a timer 156 to provide an output signal having a predetermined time period. The time interval of the timer 156 is selected by means of a potentiometer 158 so as to provide any desired time, such as between 0 and 1 seconds, for example. The output of the timer 156 is connected to the solenoid coil of the valve 70 and is operative to energize the valve 70 to apply lubricant to the trolley 30 bearing 32 for the selected time interval. The valve 70 will be energized by the timer 156 when each trolley 30 reaches the lubrication station 50 as indicated by the closure of the second detector means 86. Furthermore, energization of any valve 70 or 78 will cause current flow through the solenoid coil of the valve which will be detected by the current sense means 104 which energizes the central supply pump 54 to pressurize the lubricant flow lines 56. When each trolley 30 of the conveyor 20 has passed the lubrication station 50 and has been lubricated, the counter means 130 will be reset such that input power is no longer applied to the timer means 150.

In operation, the counter means 130 can be programmed to provide any desired frequency of lubrication to the conveyor 20. For exampale, the counter means 130 may be programmed to provide lubricant to each element or part of the conveyor 20 once for every five cycles of the conveyor 20 past the lubrication station 50. Thus, when the lead element of the conveyor 20 reaches the lubrication station 50 on the fifth cycle, the output of the counter 130 will be energized to apply power to and activate each of the timer means 150. As each element of the conveyor 20 reaches the lubrication station 50, as detected by the second and third detector switches 86 and 88, the solenoid valves 70 and 78 will be energized by each timer means 150 for a predetermined period of time to selectively apply lubricant to the trolley 30 bearing and the interconnected portions of the conveyor chain links 42. When the lead element of the conveyor returns to the lubrication station 50 on its next cycle, the counter means 130 will be reloaded with new count information and lubrication will be terminated.

As shown in FIG. 4, the conveyor lubrication apparatus 10 also includes a pressure sensor 160 which is disposed in the lubricant flow lines 56 and is adapted to detect the pressure within the flow lines 56. The pressure sensor 160, which may be any conventional pressure switch, is pre-set for a predetermined pressure and provides an output signal when the pressure within the lubricant flow lines 56 falls below the pre-set pressure. The output signal from the pressure sensor 160 is input to a flip-flop or latch circuit 162, shown in FIG. 5. Thus, when the pressure sensor 160 provides an output indicating a low pressure level within the fluid flow lines 56, the output of the flip-flop 162 will be driven to a low level which, through the NAND gate 112, prevents conduction of the transistor 114 and de-energizes the relay 116. This causes the contact 118 of the relay coil 116 to move to an open state thereby disconnecting electrical power from and de-energizing the pump 54. The pump 54 will remain de-energized until power to the control unit 94 is turned off and then back on.

The output of the flip-flop 162 also drives two serially connected transistors 164 and 166 into conduction. This will supply current to an alarm means denoted in general by reference number 168. The alarm means 168 may comprise any alarm device and preferably includes both visual and audible alarms. A low pressure condition could occur when a lubricant flow line 56 has been ruptured, one of the control valves 70 or 78 has stuck in an open position or the lubricant in the central tank 52 has reached a low level.

Thus, there has been described a unique conveyor lubrication apparatus which is operative to provide lubrication to selected elements of a conveyor once for every predetermined number of cycles of the conveyor past the lubrication station. The lubrication apparatus of the present invention is programmable so as to provide any desired lubrication cycle frequency.

The conveyor lubrication apparatus of the present invention also includes a unique current sense circuit which detects current flow to any of the lubricant control valves and is operative to energize the central lubricant tank pump to provide lubricant to the control valves for a predetermined period of time. At the expiration of the predetermined time period, the pump is de-energized until the next control valve is activated, thereby minimizing electrical power usage and extending the useful life of the pump.

We claim:

1. A conveyor lubrication apparatus for a conveyor having a plurality of interconnected and movable elements arranged in a continuous, closed loop and movable in successive cycles about the loop and a central lubricant supply reservoir pressurized by a pump, the conveyor lubrication apparatus comprising;

fluid flow conduits connected to the central pump-driven lubricant supply reservoir;

valve means disposed in fluid flow communication with the central lubricant supply reservoir by the fluid flow conduits and located in proximity with the conveyor for controlling the application of lubricant to the conveyor;

control means for controlling the energization of the valve means once for each pre-determined number of cycles of the conveyor past the lubrication apparatus, the control means including;

first detector means for detecting the presence of one particular element of the conveyor at the lubrication apparatus;

programmable counter means, responsive to the first detector means, for counting the number of cycles of the one particular element of the conveyor past the lubrication apparatus;

program means, connected as inputs to the counter means, for inputting count information to the counter means specifying the number of complete cycles of the conveyor past the lubrication apparatus between lubrication application;

the counter means providing an output specifying the application of lubricant to the conveyor during one cycle of the conveyor past the lubrication apparatus once for each programmed number of cycles of the conveyor past the lubrication apparatus;

second detector means for detecting the presence of the elements of the conveyor at the lubrication apparatus;

first timer means, responsive to the output of the counter means and the second detector means for energizing the valve means for a first pre-determined period of time to apply lubricant to the conveyor as the conveyor passes through the lubrication apparatus;

means for sensing current flow to the valve means;

second timer means, responsive to the output of the current sensing means, for providing an output signal for a second pre-determined period of time after current is initially applied to the valve means; and first switch means, responsive to the output of the second timer means, for conencting electrical power to the pump in the central lubricant supply reservoir only for the second pre-determined time period.

2. The conveyor lubrication apparatus of claim 1 further including:

pressure sensing means for sensing the fluid pressure within the fluid flow conduits, the pressure sensing means providing an output when the pressure within the fluid flow conduits falls below a pre-determined level; and the first switch means being responsive to the output of the pressure sensing means for disconnecting electrical power to the pump when the pressure falls below the predetermined level.

3. The conveyor lubrication apparatus of the claim 2 further including:

alarm means;

second switch means, responsive to the output of the pressure sensing means, for connecting electrical power to the alarm means when the pressure has fallen below a predetermined level.

* * * * *